US010793415B2

(12) United States Patent
Choi et al.

(10) Patent No.: US 10,793,415 B2
(45) Date of Patent: Oct. 6, 2020

(54) WATER DISPENSING APPARATUS AND CONTROL METHOD THEREOF

(71) Applicant: LG ELECTRONICS INC., Seoul (KR)

(72) Inventors: Byoungsuk Choi, Seoul (KR); Shinhyun Park, Seoul (KR); Sun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 152 days.

(21) Appl. No.: 16/028,144

(22) Filed: Jul. 5, 2018

(65) Prior Publication Data
US 2018/0312387 A1 Nov. 1, 2018

Related U.S. Application Data

(63) Continuation of application No. 15/000,315, filed on Jan. 19, 2016, now Pat. No. 10,040,679.

(30) Foreign Application Priority Data

Jan. 20, 2015 (KR) .................. 10-2015-0009012
Jan. 20, 2015 (KR) .................. 10-2015-0009013
Jan. 20, 2015 (KR) .................. 10-2015-0009016

(51) Int. Cl.
*B67D 1/12* (2006.01)
*G01F 23/296* (2006.01)
(Continued)

(52) U.S. Cl.
CPC ......... *B67D 1/1238* (2013.01); *G01F 23/296* (2013.01); *B67D 1/0871* (2013.01);
(Continued)

(58) Field of Classification Search
CPC .. B67D 1/1238; B67D 1/0871; B67D 1/0875; B67D 2001/1259; B67D 2210/00036;
(Continued)

(56) References Cited

U.S. PATENT DOCUMENTS 7,743,801 B2   6/2010 Janardhanam et al.
8,109,301 B1 *  2/2012 Denise .................. F25D 29/001
                                                        141/360
(Continued)

FOREIGN PATENT DOCUMENTS

KR       10-0816149       3/2008
KR    10-2008-0081457    9/2008
(Continued)

OTHER PUBLICATIONS

Korean Office Action dated Dec. 22, 2015 issued in Application No. 10-2015-009012.
(Continued)

*Primary Examiner* — Andrew D Stclair
(74) *Attorney, Agent, or Firm* — KED & Associates, LLP

(57) ABSTRACT

A water dispensing apparatus may include a dispenser housing at which a container accommodation part accommodating a container is formed to be recessed; a water nozzle provided at an inner surface of the dispenser housing which defines an upper surface of the container accommodation part; a water level detecting member provided at the inner surface of the dispenser housing close to the water nozzle and configured to detect a level of water filled in the container; a target water level input part provided to input the level of water filled in the container; and a water level indicating unit provided at an inner surface of the dispenser housing which defines a side surface of the container accommodation part to indicate a water level on the container.

10 Claims, 14 Drawing Sheets

(51) Int. Cl.
*B67D 1/08* (2006.01)
*G08B 5/36* (2006.01)
(52) U.S. Cl.
CPC .......... *B67D 1/0875* (2013.01); *B67D 1/0888* (2013.01); *B67D 2001/1259* (2013.01); *B67D 2210/00036* (2013.01); *G08B 5/36* (2013.01)
(58) Field of Classification Search
CPC ..... B67D 1/124; B67D 3/0025; G01F 23/296; G08B 5/36; G08B 5/38
See application file for complete search history.

(56) References Cited

U.S. PATENT DOCUMENTS

| | | | |
|---|---|---|---|
| 8,245,735 B2* | 8/2012 | Chase | B67D 1/001 141/1 |
| 8,364,321 B2* | 1/2013 | Kollep | A47J 31/407 700/283 |
| 2008/0216504 A1* | 9/2008 | Kim | B67D 1/1238 62/338 |
| 2009/0183796 A1 | 7/2009 | Chase et al. | |
| 2010/0175783 A1 | 7/2010 | Kim | |
| 2010/0236270 A1 | 9/2010 | Choi | |
| 2012/0138629 A1* | 6/2012 | Ashrafzadeh | B67D 1/0858 222/1 |
| 2014/0166153 A1 | 6/2014 | Waugh et al. | |

FOREIGN PATENT DOCUMENTS

| | | |
|---|---|---|
| KR | 20-0463087 Y1 | 10/2012 |
| KR | 10-2013-0105383 | 9/2013 |
| WO | WO 2006/063645 | 6/2006 |

OTHER PUBLICATIONS

Korean Office Action dated Apr. 4, 2016 issued in Application No. 10-2015-0009016.
Korean Office Action dated Sep. 1, 2016 issued in Application No. 10-2015-0009012.
Korean Office Action dated Sep. 1, 2016 issued in Application No. 10-2015-0009013.
United States Office Action dated Oct. 20, 2017 issued in U.S. Appl. No. 15/000,315.

* cited by examiner

WATER DISPENSING APPARATUS AND CONTROL METHOD THEREOF

CROSS-REFERENCE TO RELATED APPLICATIONS

This application is a Continuation Application of prior U.S. patent application Ser. No. 15/000,315 filed Jan. 19, 2016, which claims priority under 35 U.S.C. § 119 to Korean Application No. 10-2015-0009012, filed on Jan. 20, 2015, Korean Application No. 10-2015-0009013, filed on Jan. 20, 2015, and Korean Application No. 10-2015-0009016, filed on Jan. 20, 2015, whose entire disclosures are hereby incorporated by reference.

BACKGROUND

1. Field

A water dispensing apparatus and a control method thereof are disclosed herein.

2. Background

Generally, a water dispensing apparatus is an apparatus which supplies water, and dispenses the water as much as a user wants according to the user's operation. The stored water is dispensed through a nozzle when the user operates a lever or a button. The water dispensing apparatus includes a valve where the nozzle is opened while the user operates the lever or the button, and the water is dispensed. Based on a visual inspect of an amount of water filled in a cup or a container the user terminates an operation of the lever or the button.

The water dispensing apparatus may be applied to various fields, and may be representatively applied to a refrigerator and a water purifier. In particular, the water dispensing apparatus provided at the refrigerator and the water purifier may have a function in which a preset amount of water is automatically supplied according to the user's operation.

In Korean Patent No. 10-0816149, a height of the container seated in the container seating part is determined by a first ultrasonic sensor, and a level of water filled in the container is determined by a second ultrasonic sensor. When the water level reaches a predetermined level, an operation of an actuator is stopped, and dispensing of the water is stopped.

In U.S. Pat. No. 7,743,801, a first sensor provided at a side surface of a container for receiving water measures a height of the container, and a second sensor provided above the container detects a level of water filled in the container. When the water level reaches a predetermined level, dispensing of the water is stopped.

The above-described water dispensing apparatus or system, an error occurs when the height of the container is initially measured, or the height of the container is erroneously measured due to external factors. Based on such an error, it may not possible to dispense an amount of water as much as the user wants. For example, when a thickness of the container is thicker than that of a normal cup, or the container has a structure in which a handle thereof extends further upward than an upper end thereof, the level of water which is actually filled in the container may not be accurately measured by a shape of the container.

Even when a spoon, a fork or a straw is put in the container, the sensor may not accurately recognize the height of the container. There may also occur a problem that measuring of the height of the container is not accurately performed according to a position of the container or a sensor state, and thus reliability in an operation of the sensor is lowered.

In U.S. Patent Publication No. 2014/0166153, a refrigerator detects a height of a container and a level of water in the container when a user presses an automatic water supply button, and allows dispensing of the water. There is also disclosed a structure in which a desired value, such as 50%, 80% and 90%, based on the height of the container, is input through an operation of a button, and a state in which the water is filled is indicated through a display in the form of a character.

However, according to the above-described art, since an amount of water to be dispensed is set to a percentage of the height, the user may not intuitionally grasp the amount of dispensed water. As a result, there is a disadvantage that the user should operate again the button to obtain a desired amount of water. Since the user may not also intuitively grasp a dispensing state, an accurate information of a target water level or a change of the water level may not be substantially delivered to the user.

The above disclosure of the prior art is incorporated herein by reference.

BRIEF DESCRIPTION OF THE DRAWINGS

Embodiments will be described in detail with reference to the following drawings in which like reference numerals refer to like elements, and wherein.

DETAILED DESCRIPTION

A water dispensing apparatus according to the present disclosure may be applied to various apparatuses such as a refrigerator and a water purifier in which water can be automatically supplied. Hereinafter, for convenience of explanation and understanding, an example in which the water dispensing apparatus is applied to a door of a refrigerator will be described.

Figure 1:
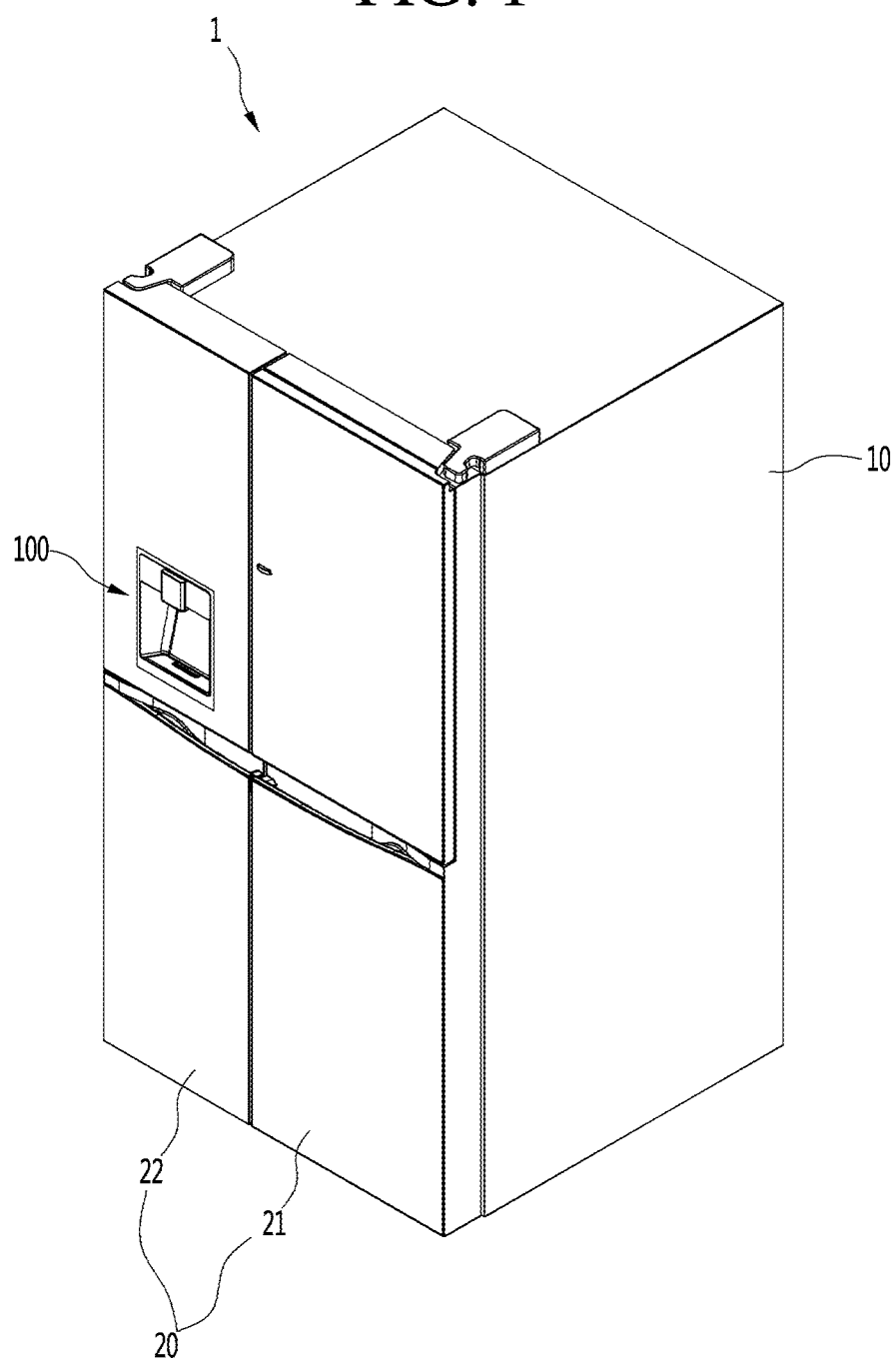
FIG. 1 is a perspective view of a refrigerator equipped with a water dispensing apparatus according to one embodiment of the present disclosure.

As illustrated in FIG. 1, a refrigerator 1 disclosure may include a main body 10 which forms a storage compartment of which a front surface is opened, and a door 20 which opens and closes the storage compartment. The door 20 may include one pair of refrigerator compartment doors 21 and one pair of freezer compartment doors 22. Upper and lower ends of each of the refrigerator compartment doors 21 and the freezer compartment doors 22 may be rotatably connected to the main body 10 by a hinge, and may selectively open and close a part or the whole of each of a refrigerator compartment and a freezer compartment.

A water dispensing apparatus 100 may be provided at a front surface of the refrigerator compartment door 21 or the freezer compartment door 22. FIG. 1 illustrates an example in which the water dispensing apparatus 100 is provided at the freezer compartment door 22. However, the water dispensing apparatus 100 may be provided at the refrigerator compartment door 21. The water dispensing apparatus 100 may be provided at various apparatuses such as a water purifier in which water is automatically dispensed, and is not limited to the refrigerator 1. The water dispensing apparatus 100 may be formed to be recessed from a front surface of the freezer compartment door 22, such that water or ice may be dispensed from an outside of the refrigerator 1 without opening of the freezer compartment door 22.

An ice machine may be provided at a rear surface of the freezer compartment door 22. The ice machine may freeze the supplied water, may make the ice, and then may store the ice. An ice storage of the ice machine is in communication with the water dispensing apparatus 100 and an ice chute. Therefore, when an operation unit (which will be described below) provided at the water dispensing apparatus 100 is operated, the ice stored in the ice storage part of the ice machine may be dispensed to an outside through the water dispensing apparatus 100.

A filter device for purifying the water supplied from a water supply source located outside the refrigerator 1 may be provided inside the main body 10, and a water tank in which the water purified while passing through the filter device is stored may be provided. The water tank may be maintained in a cooling state, which is higher than a freezing temperature, by cooling air in the storage compartment in which the water tank is located. The water tank is fluidly connected with the water dispensing apparatus 100 and/or the ice machine, and thus the water stored in the water tank may be dispensed through the water dispensing apparatus 100 or may be supplied as water necessary to make the ice. Of course, the water tank may not be connected to the water supply source, but may be formed so that the water is filled therein from an outside, and then the water tank is installed inside the storage compartment.

Figure 2:
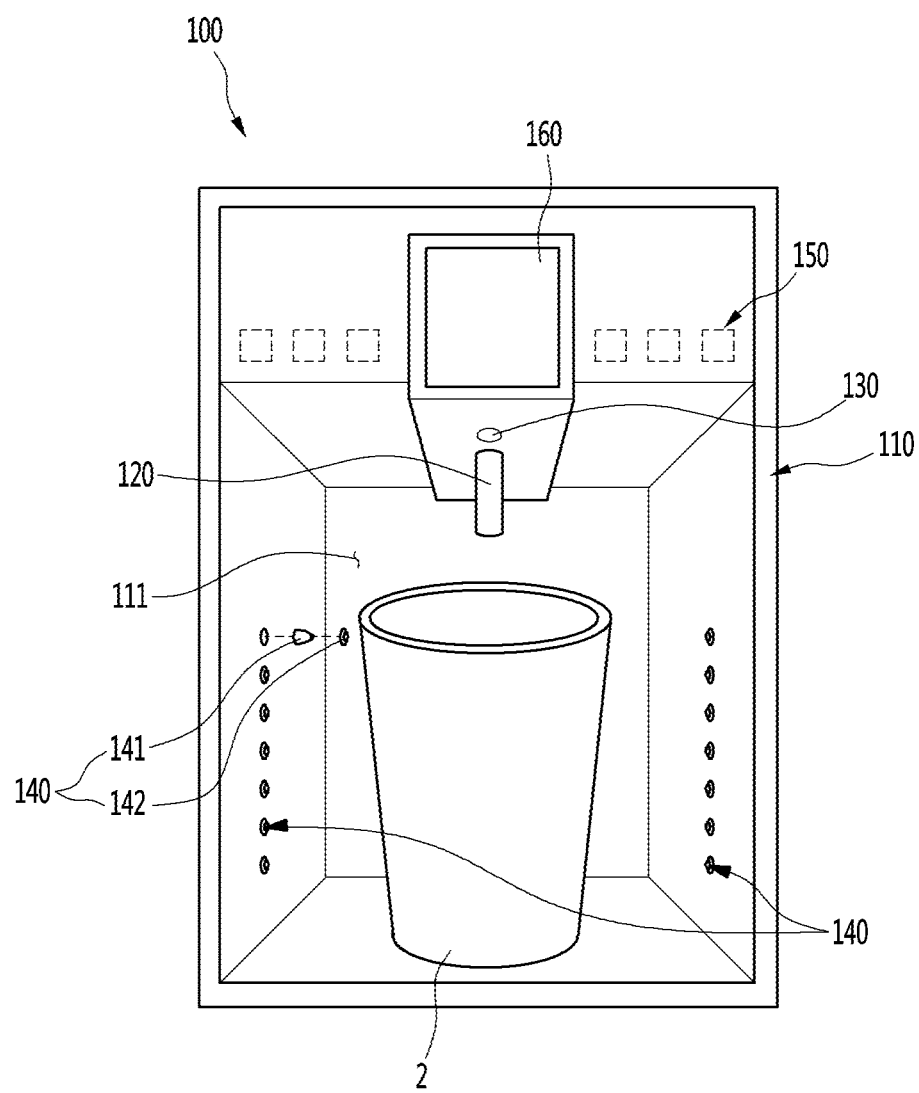
FIG. 2 is a front view of the water dispensing apparatus according to a first embodiment of the present disclosure.
Figure 3:
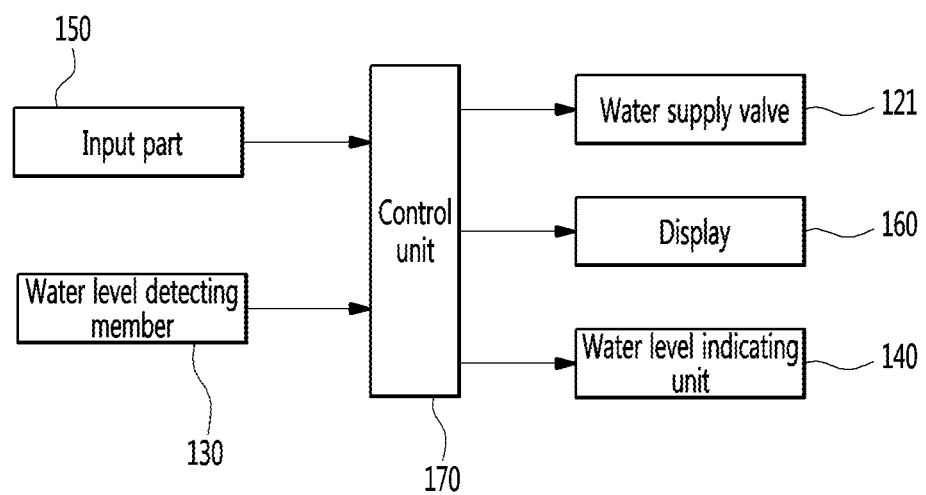
FIG. 3 is a block diagram illustrating a configuration of the water dispensing apparatus according to the first embodiment of the present disclosure.

Referring to FIGS. 2 and 3, the water dispensing apparatus 100 is provided at the front surface of the freezer compartment door 22. The water dispensing apparatus 100 may be formed to be exposed to an outside through the front surface of the freezer compartment door 22, and to enable a user to directly operate it and to check a use state.

The water dispensing apparatus 100 includes a dispenser housing 110, and the dispenser housing 110 forms a container accommodation part or a recess 111, which is recessed to accommodate a container 2. A water nozzle 120 which is connected to a water supply valve 121 so as to selectively dispense the water, and a water level detecting member 130 (a water level detector) which detects a level of water filled in the container 2 may be provided at an upper surface of the container accommodation part 111. A water level indicating unit 140 (a level indicator) which indicates a target level and a current level of water filled in the container 2 may be provided at both left and right side surfaces of the dispenser housing 110. An input part 150 (or an input interface) for operating the water dispensing apparatus 100, and a display 160 for displaying an operation state of the water dispensing apparatus 100 may be further provided at an upper area of the dispenser housing 110.

A bottom plate may be provided at a bottom surface of the container accommodation part 111, and the bottom plate may be withdrawn forward according to a size of the container 2. A front end of the bottom plate may be withdrawn further forward than the front surface of the freezer compartment door 22, and the container 2 having a large volume may be seated thereon.

A dispensing lever, which generates a water dispensing command signal, may be further provided at a rear wall surface of the dispenser housing 110. The dispensing lever serves to enable the user to obtain a desired amount of water through the water nozzle 120. When the dispensing lever is pressed and thus switched on, the water supply valve 121 may be opened, and the water may be continuously dispensed while the dispensing lever is pressed. And when a force which presses the dispensing lever is released, the dispensing lever is switched off, and the water supply valve 121 may be closed, and the dispensing of the water may be stopped.

For example, when the user presses the dispensing lever using the container 2, the water is supplied, and when the container 2 is separated from the dispensing lever after the desired amount of water is supplied while the dispensing lever is pressed, supplying of the water is stopped.

The input part 150 for inputting an operation command of the water dispensing apparatus 100 may be further provided at the upper area of the dispenser housing 110 corresponding to an upper portion of the container accommodation part 111. The input part 150 is provided to establish various conditions including a state or a type of the water dispensed through the water dispensing apparatus 100, or various operations, and may include a plurality of touch buttons or press buttons. An operation state of the refrigerator 1 may be set through the operation of the input part 150. The touch button also may allow dispensing of the liquid or water rather than a lever.

The user may select a type of the water dispensed through the water nozzle 120 by an operation of the input part 150, and the type of the water may include purified water and cold water. The purified water may be the water, which has been purified at a room temperature, and the cold water may be the water, which has been purified and cooled at a temperature lower than the room temperature.

The user may establish a target level L1 of water dispensed through the water nozzle 120 through the operation of the input part 150. A plurality of input buttons may be arranged at the input part 150 to set the level of water filled in the container 2 through the water nozzle 120, and an amount of water may be set according to each of the input buttons. By pressing a certain input button, an amount of water corresponding to the pressed input button may be dispensed. In another method, by pressing several times the same input button, the amount of water to be dispensed may be set or changed.

The amount of water filled in the container 2 may be set to a height based on the bottom surface of the container accommodation part 111, i.e., the bottom surface on which the container 2 is seated. When the supply of the water is started, the water may be supplied into the container 2 until the water level reaches the height set through the operation of the input part 150, i.e. the target water level L1. In this case, when a size of the container 2 is changed, the water level is the same, but the amount of water filled in the container 2 is also changed.

When the ice chute, which connects the upper surface of the container accommodation part 111 with the ice storage part of the ice machine, is provided inside the dispenser housing 110, the ice may be dispensed to the container accommodation part 111 through the ice chute by operating the input part 150.

The input part 150 may be a knob which is operated in a rotating method, or a touch pad which is operated in a touching and dragging method. The input part 150 may be provided at a left area or a right area of the dispenser housing 110, instead of the upper portion of the dispenser housing 110.

The display 160 is provided at the upper area of the dispenser housing 110 corresponding to the upper portion or area of the container accommodation part 111, and formed to indicate a variety of operation information of the water dispensing apparatus 100. For example, a selecting result and a target water level of one of the purified water, the cold water, the water and the ice may be indicated through the display 160. Setting of an operation condition of the water dispensing apparatus 100, and whether or not components of the water dispensing apparatus 100 are normal may be indicated through the display 160.

The display 160 may include an LCD panel, and an LED panel having a plurality of LED elements. The information may be output through the display 160 in the form of a video, an image or a character. A general operation state of the refrigerator 1, e.g., set temperature or current temperature information of each of the refrigerator compartment and the freezer compartment may be indicated through the display 160.

The water nozzle 120 may be provided at the upper surface of the container accommodation part 111. The water nozzle 120 may be disposed at a center of the upper surface of the container accommodation part 111, and may be formed in a tube shape so that the water is dispensed toward the container 2 put on a bottom of the container accommodation part 111.

An outlet end of the water nozzle 120 may extend downward from the upper surface of the container accommodation part 111 in a predetermined length, and may protrude inside the container accommodation part 111. The user may appropriately adjust a position of the container 2 so that an extension line passing through a center of the water nozzle 120 is located at a center of an upper surface of the container 2. The user may also visually check a dispensing state of the water through the water nozzle 120.

The water nozzle 120 may be an end of a water supply path which extends from the external water supply source or the water tank installed inside the refrigerator 1, and the water supply valve 121 may be provided at the water supply path. The user may select opening or closing of the water supply valve 121 by operating the input part 150, and thus may determine whether the supplying of the water to the water nozzle 120 is started.

The water level detecting member 130 installed at the upper surface of the container accommodation part 111 may include an ultrasonic sensor which detects the level of water filled in the container 2. The ultrasonic sensor may be an active type in which transmitting and receiving of an ultrasonic signal are performed at the same time, and, if necessary, a transmitter and a receiver may be formed separately, and then may be respectively provided at an upper surface of a space in the dispenser housing 110. Of course, the water level detecting member 130 may include sensors and devices of other types that detect the level of water filled in the container 2.

The water level detecting member 130 may be located at a position close to the water nozzle 120 to transmit the ultrasonic signal toward a center of the container 2. A plurality of water level detecting members 130 may be provided to more accurately detect the level of water filled in the container 2.

Figure 4:
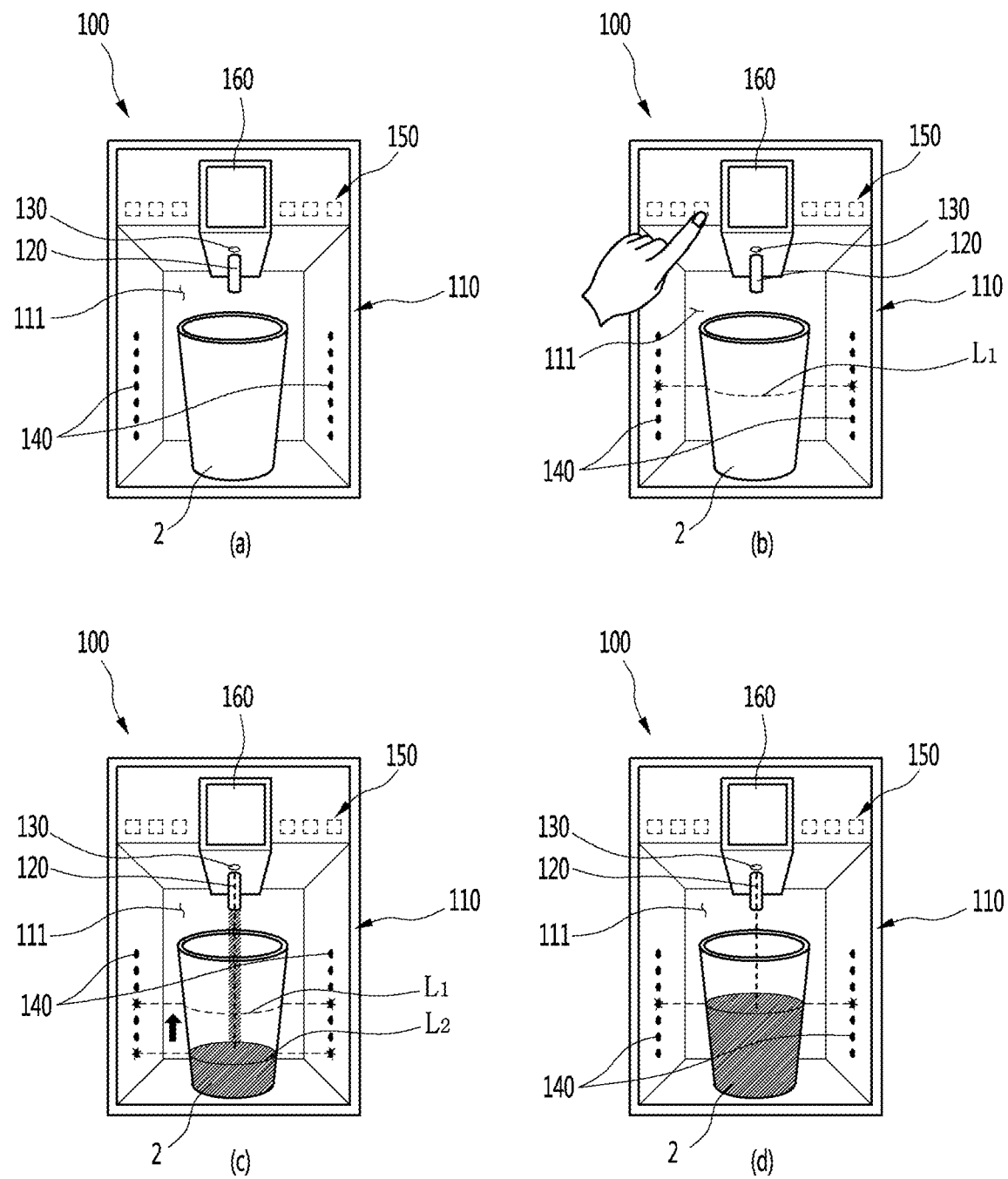
FIG. 4 is a view sequentially illustrating an operation process of the water dispensing apparatus according to the first embodiment of the present disclosure.

The water level indicating unit 140 may be provided at both of left and right side surfaces of the container accommodation part 111. As illustrated in FIG. 4, the water level indicating unit 140 is formed to allow the user to intuitively and/or visually check the target level L1 and the current level L2 of water filled in the container 2.

The water level indicating unit 140 may include a plurality of light emitting members 141 which emit light toward a side surface of the container 2. The plurality of light emitting members 141 may be disposed from the bottom of the container accommodation part 111 to a height thereof close to the upper surface of the container accommodation part 111 so as to be spaced apart from each other at predetermined intervals. Each of the light emitting members 141 may be connected to a control unit 170, and may receive ON/OFF information from the control unit 170.

Each of the light emitting members 141 may have height information, and the height information may be stored in a memory of the control unit 170. Therefore, when the user sets a desired water level through the input part 150, the target water level L1 may be indicated by the light emitting members 141, which may be light emitting diodes. The height information of the light emitting member 141 which is turned on may be compared with the current water level L2 in the control unit 170, and thus the water may be supplied by the target water level L1.

The light emitting members 141 may be disposed at each of the left and right side surfaces of the container accommodation part 111, and may be disposed to face each other at the same heights. Accordingly, the light emitted from the light emitting members 141 may be radiated to the side surface of the container 2, and the target water level L1 and the current water level L2 may be indicated on the surface of the container 2 by the light emitting members 141 which are turned on and off. However, the light emitting members 141 may be disposed at only one of the left side surface and the right side surface of the container accommodation part 111.

While the container 2 is seated at the container accommodation part 111, the light emitting members 141 may emit the light from both of left and right sides of the container 2 toward the side surface of the container 2. Among the plurality of light emitting members 141, one light emitting member 141 corresponding to a set height is turned on, and another light emitting member 141 corresponding to the current water level is turned on, and thus the target water level L1 and the current water level L2 may be indicated on the side surface of the container 2.

The water level indicating unit 140 may further include a cover 142. The cover 142 is a member which enables the light emitted from the light emitting members 141 to be more clearly indicated on the container 2, and may include a structure having a plurality of slits through which the light passes, or a lens structure which enables the light emitted from the light emitting members 141 to be focused on the surface of the container 2.

The cover 142 may be installed on a light emitting surface of each of the light emitting members 141, and thus may be formed as one assembly together with the light emitting members 141. Alternatively, the cover 142 having a single body may be longitudinally installed at the left and right side surfaces of the container accommodation part 111 to cover all of the plurality of light emitting members 141.

The control unit 170 which controls the operation of the water dispensing apparatus 100 may be formed to be electrically connected to the input part 150, the water level detecting member 130, the water supply valve 121, the display 160 and the water level indicating unit 140, and thus to control them.

The control unit 170 receives information of the target water level L1 input through the input part 150 and information of the current water level L2 indicated through the water level indicating unit 140, and stores the received information in the memory. The control unit 170 compares the information of the target water level L1 with the information of the current water level L2, and then controls the water supply valve 121 to be maintained in an opened state until the current water level L2 reaches the target water level L1. The target water level L1 and the current water level L2 are absolute heights based on the bottom of the container accommodation part 111, and are not affected by a size and a shape of the container 2. However, when the container 2 is changed, the amount of water supplied under the same target water level condition may also be changed.

Figure 5:
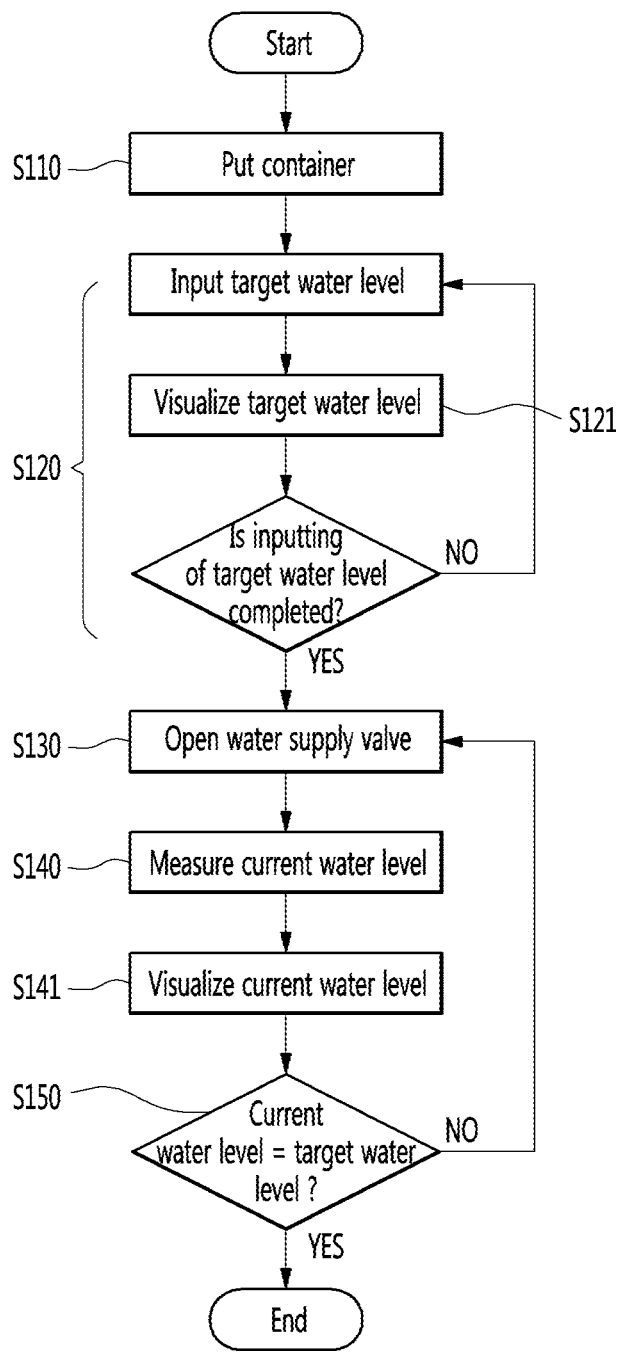
FIG. 5 is a flowchart illustrating an operation of the water dispensing apparatus according to the first embodiment of the present disclosure.

Referring to FIGS. 4 and 5, first, the container 2 is located inside the container accommodation part 111 to obtain the water through the water dispensing apparatus 100, as illustrated in FIG. 4A. At this point, the position of the container 2 may be appropriately adjusted by the user so that the water nozzle 120 is located as close to a vertical line passing through a center of a cross section of the container 2 as possible. Accordingly, the water level detecting member 130 may more accurately detect the level of water filled in the container 2.

The water level detecting member 130 may detect the container 2 put in the container accommodation part 111 using the ultrasonic signal. The container accommodation part 111 generates the ultrasonic signal, and measures a distance from the water level detecting member 130 to the bottom of the container accommodation part 111. At this point, when the measured distance is the same as an initially set distance to the bottom of the container accommodation part 111, it is determined that the container 2 does not exist in the container accommodation part 111, and when the measured distance is shorter than the initially set distance to the bottom of the container accommodation part 111, it is determined that the container 2 exists in the container accommodation part 111. If needed, a separate sensor or a detecting device, such as an ultrasonic sensor or proximity sensor, a contact sensor, a switch device or the like, for confirming existence of the container 2 may be provided [S110].

When the existence of the container 2 is confirmed by the water level detecting member 130, the user is in a state which can input the water level through the input part 150. However, while the existence of the container 2 is not confirmed by the water level detecting member 130, the water supply valve 121 is not opened, even though the input part 150 is operated, and a fact that the container 2 is not detected is output through the display 160. In other words, when the container 2 is not detected, it is not possible to input a condition through the input part 150.

The user sets the level of water to be filled in the container 2, i.e., the target water level L1 by operating the input part 150. Here, the target water level L1 is a dispensing height of the water based on the bottom surface of the container accommodation part 111.

As described above, a method for inputting the target water level L1 may be performed by pressing one of the plurality of buttons provided at the input part 150. A corresponding water level is set with respect to each of the plurality of buttons, and thus when a certain button is pressed, the corresponding water level set with respect to the pressed button is selected. And when several buttons among the plurality of buttons are operated, the water level set with respect to the finally pressed button is set as the target water level L1. In another method, one of the plurality of buttons may be repeatedly pressed several times so that the corresponding water level is accumulated, and thus the desired water level may be determined.

As illustrated in FIG. 4B, the target water level L1 input through the input part 150 may be indicated on an outer side surface of the container 2 through the water level indicating unit 140. The target water level L1 input through the user's operation may be indicated on the container 2 by radiating the light from the water level indicating unit 140 to the surface of the container 2. When the user presses repeatedly one of the buttons provided at the input part 150, or presses, in turn, the several buttons and thus the target water level L1 is changed, the water level indicating unit 140 which emits the light may also be changed. The user may accurately set the desired water level while checking a height change of the light radiated on the container 2.

When inputting of the target water level L1 through the input part 150 is completed, the control unit 170 controls the light emitting member 141 located at a height corresponding to the set water level to emit the light and to indicate the set target water level L1 on the surface of the container 2. At this point, the light emitting member 141 which indicates the finally set target water level L1 is continuously maintained in an ON state, and thus allows the user to confirm whether the water filled in the container 2 reaches the target water level L1 [S120].

When the inputting of the target water level L1 is completed, the water supply valve 121 is opened, and the water is supplied into the container 2 through the water nozzle 120 [S130]. At this point, the water level detecting member 130 continuously transmits and receives the ultrasonic signal, and checks a change of the water level in the container 2. And the light emitting member 141 of the water level indicating unit 140 corresponding to the level of water filled in the container 2 is turned on, and indicates the current water level L2, as illustrated in FIG. 4C.

At this point, a color of the light emitted from the light emitting member 141 which visualizes the current water level L2 may be set differently from that of the light emitted from the light emitting member 141 which visualizes the target water level L1. Through this, the user may distinguish the target water level L1 from the current water level L2, and thus may clearly recognize that the current water level L2 gradually reaches the target water level L1.

In other words, while the water is being supplied, one light emitting member 141 which indicates the target water level L1 is maintained in the ON state, and the light emitting members 141 which indicate the current water level L2 are changed according to a change in the water level, and thus repeatedly turned on/off [S140].

Meanwhile, the water supply valve 121 is opened while the water filled in the container 2 reaches the target water level L1. When the current water level L2 is the same as the target water level L1, as illustrated in FIG. 4D, the light emitting member 141 which indicates the target water level L1 becomes the same as the light emitting member 141 which indicates the current water level L2. That is, the target water level L1 and the current water level L2 are indicated by the single light emitting member 141. And the color of the emitted light may be the color for indicating the target water level L1, or may be changed into the color for indicating the current water level L2.

In this state, when the current water level L2 is the same as the target water level L1, the control unit 170 determines that the target water level L1 is satisfied, and closes the water supply valve 121. And information notifying that the dispensing of the water is completed may be displayed on the display 160 sequentially or at the same time when the light emitting member 141 is turned off. The information notifying that the dispensing of the water is completed may include acoustic information output through a speaker as well as the video or the character displayed on the display 160. That is, the character or video information may be output together with the acoustic information.

The control unit 170 initializes data of the water level detecting member 130 and the water level indicating unit 140, and terminates a water dispensing process [S150].

Meanwhile, the water dispensing apparatus according to the present disclosure may have various other embodiments other than the above-described embodiment. A water level indicating unit according to a second embodiment of the present disclosure is characterized by including one pair of light emitting members which are disposed at both side surfaces of the container accommodation part 111 to be vertically movable, wherein one of the pair of light emitting members indicates the target water level, and the other one indicates the current water level. A water dispensing apparatus according to the second embodiment of the present disclosure may have the same configuration as that of the water dispensing apparatus according to the above-described embodiment, except the water level indicating unit. Therefore, the same components may be designated by the same reference numerals, and detailed descriptions thereof may be omitted.

Even though some of essential components of the water dispensing apparatus except the water level indicating unit which have been explicitly described in the above-described embodiment are not described in the embodiment, they are included in the water dispensing apparatus according to the embodiment.

Figure 6:
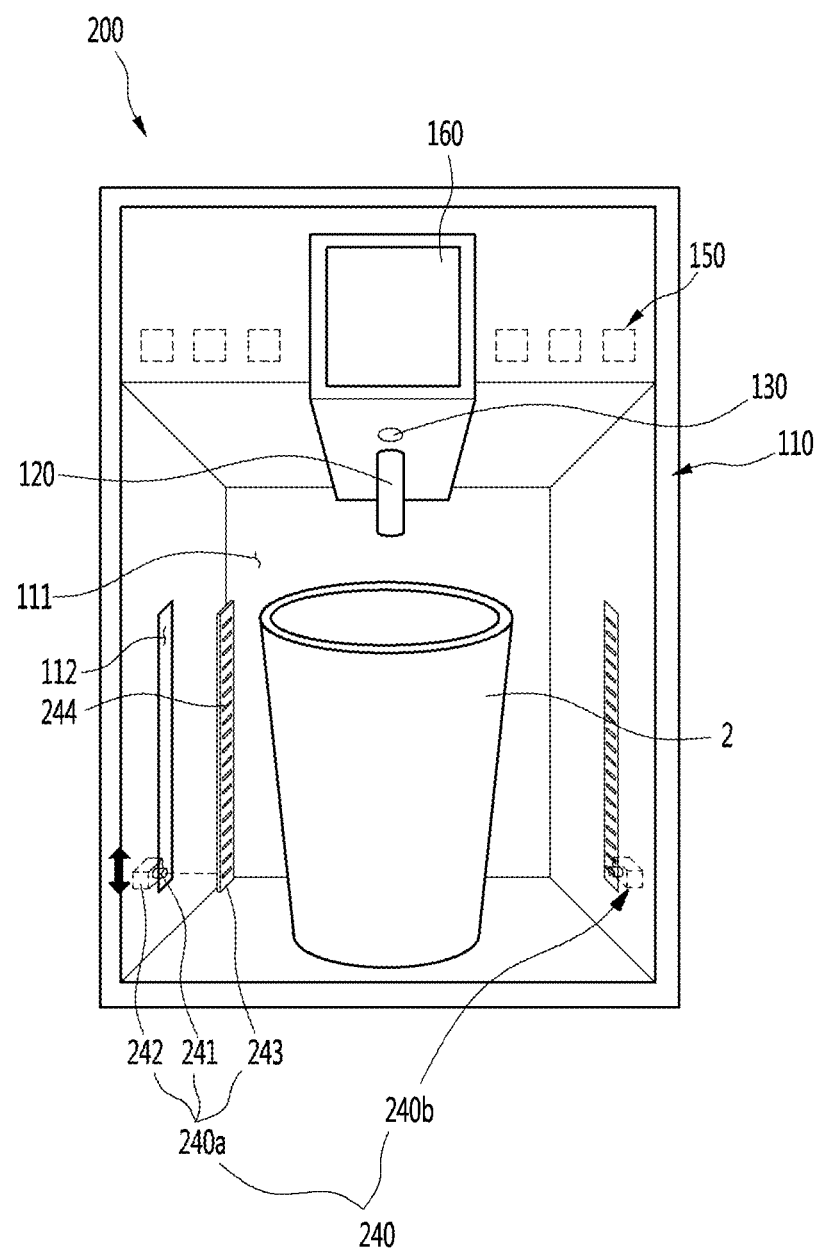
FIG. 6 is a front view of a water dispensing apparatus according to a second embodiment of the present disclosure.
Figure 7:
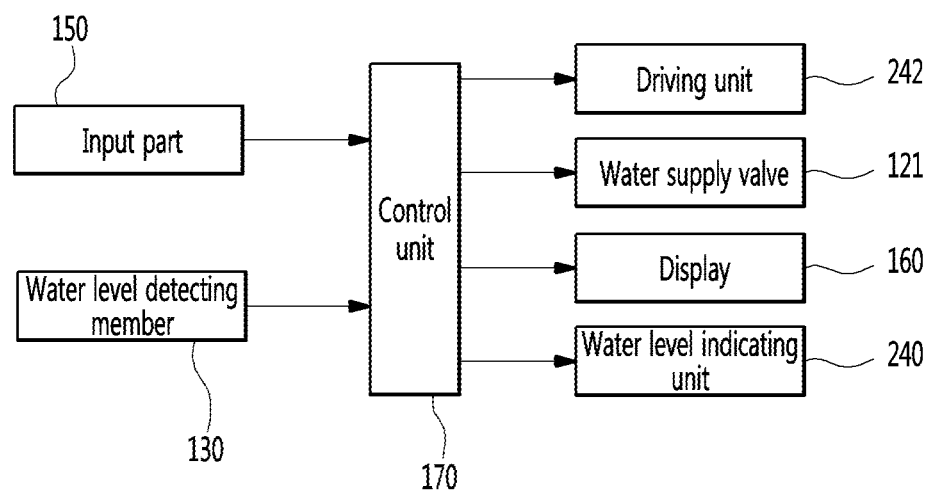
FIG. 7 is a block diagram illustrating a configuration of the water dispensing apparatus according to the second embodiment of the present disclosure.

Referring to FIGS. 6 and 7, a water dispensing apparatus 200 according to the second embodiment of the present disclosure includes a dispenser housing 110 in which a container accommodation part 111 for accommodating a container 2 is formed. A slit-shaped opening 112 which extends long vertically is formed at each of left and right side surfaces of the container accommodation part 111, and a water level indicating unit 240 is disposed at each of the openings 112. The opening 112 extends in a length corresponding to a vertical movement distance of the water level indicating unit 240, and may be defined as a vertical movement path of the water level indicating unit 240.

The water level indicating unit 240 may include a light emitting member 241 which emits light to indicate a target water level L1 and a current water level L2 on a surface of the container 2, a driving unit 242 which enables the light emitting member 241 to be vertically movable, and a cover member 243 which covers the light emitting member 241 and the driving unit 242 and prevents water penetration.

More specifically, the water level indicating unit 240 may include a target water level indicating unit 240a which is provided at one of the left and right side surfaces of the container accommodation part 111, and a current water level indicating unit 240b which is provided at the other one of the left and right side surfaces thereof. The target water level indicating unit 240a and the current water level indicating unit 240b may be disposed to face each other.

Each of the target water level indicating unit 240a and the current water level indicating unit 240b has the same structure, and the target water level indicating unit 240a is different from the current water level indicating unit 240b in only an installation position and operation thereof. Hereinafter, the target water level indicating unit 240a and the current water level indicating unit 240b are commonly referred to as the water level indicating unit 240 (or a water level indicator), and a structure thereof will be described.

The water level indicating unit 240 is disposed to horizontally emit the light toward a side surface of the container 2. The driving unit 242 may have a rack and pinion structure which is vertically moved by a motor. The rack may include a linear type rack or a caterpillar type rack. The driving unit 242 may include various types of driving units which enable the light emitting member 241 to be vertically reciprocated, other than the rack and pinion structure.

Among the driving units 242, the driving unit 242 of the target water level indicating unit 240a may operate so that the light emitting member 241 is moved to a height input through an operation of an input part 150 and indicates the target water level L1. Among the driving units 242, the driving unit 242 of the current water level indicating unit 240b is operated so that the light emitting member 241 is moved to a height corresponding to a current water level, as the water is filled in the container 2 and a water level is increased, and indicates the current water level L2.

The cover member 243 (or cover) may be formed of a transparent plastic or glass material, which enables the light emitted from the light emitting member 241 to penetrate therethrough while covering the opening 112. A plurality of slits 244 may be formed at the cover member 243 so that the light emitted from the light emitting member or element 241 is not scattered, but is focused to the surface of the container 2. A height of each of the plurality of slits 244 may be stored in a control unit, and the light emitting member 241 may be moved upward in a plurality of stages by a distance corresponding to an interval between the slits 244.

When the current water level has a height corresponding to the height of each of the plurality of slits 244, a value of the detected current water level may be transferred to the control unit, and thus the light emitting member 241 of the current water level indicating unit 240b may be moved in the plurality of stages corresponding to a position of each of the plurality of slits 244. Meanwhile, the embodiment may also include that the target water level indicating unit 240a is disposed at the right side of the container accommodation part 111, and the current water level indicating unit 240*b* is disposed at the left side of the container accommodation part 111.

Figure 8:
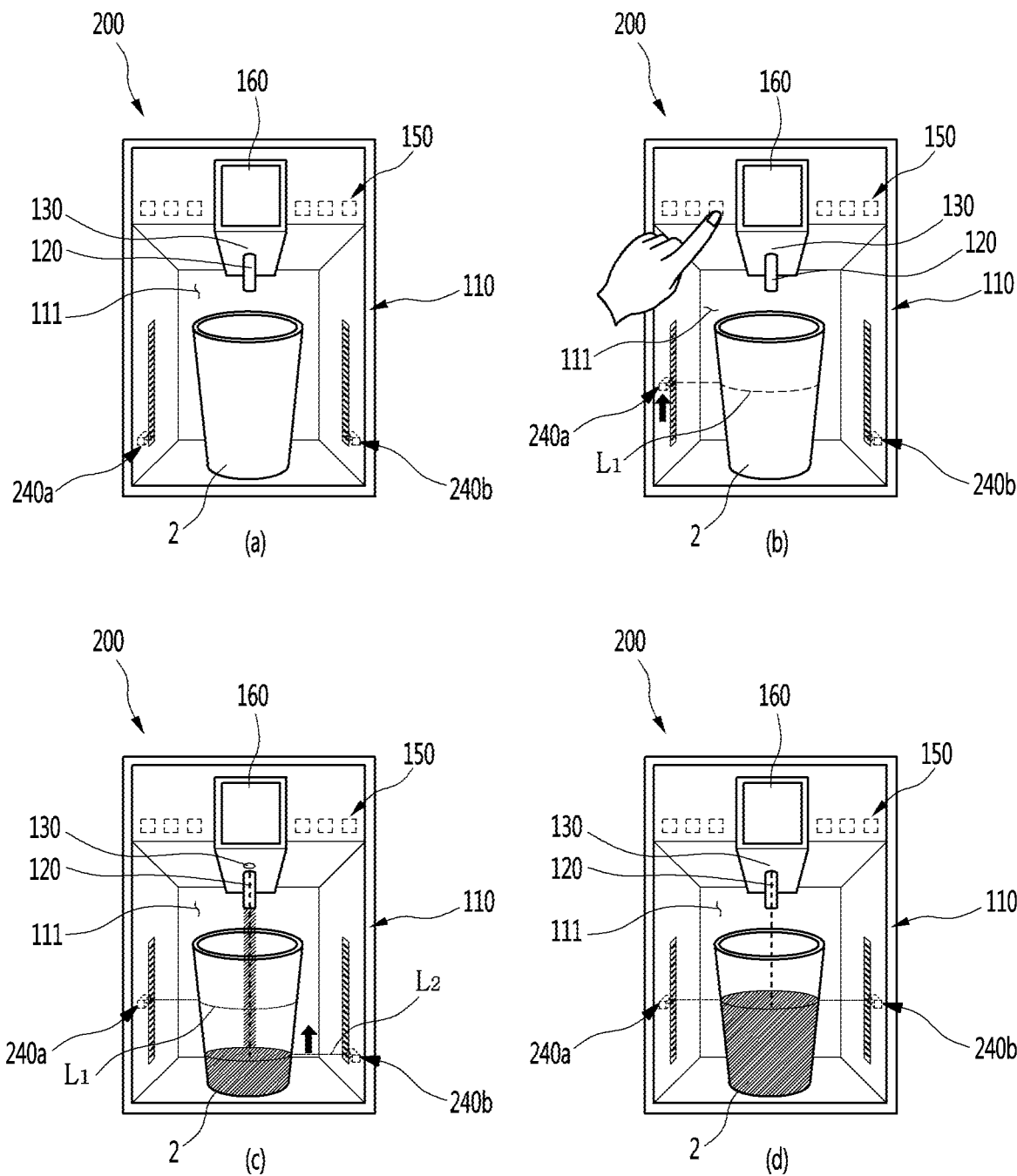
FIG. 8 is a view sequentially illustrating an operation process of the water dispensing apparatus according to the second embodiment of the present disclosure.

FIG. 8 is a view sequentially illustrating an operation process of the water dispensing apparatus according to the second embodiment of the present disclosure. To obtain the water through the water dispensing apparatus 200, first, the container 2 is located at the container accommodation part 111, as illustrated in FIG. 8A, and a process in which the target water level is input, as illustrated in FIG. 8B, is the same as that in the above-described embodiment. Accordingly, repeated description thereof will be omitted.

Specifically, when the target water level L1 is input through the input part 150, the target water level indicating unit 240*a* located at the left side is moved up, and emits the light to an outer side surface of the container 2. That is, the driving unit 242 is operated corresponding to the target water level L1 inputted by the user, and the light emitting member 241 is moved up from a bottom surface of the container accommodation part 111 to a height corresponding to the target water level L1.

The light emitting member 241 of the target water level indicating unit 240*a* is continuously maintained in an ON state, and enables the user to check whether the water filled in the container 2 reaches the target water level L1. Height information of the light emitting member 241 set with respect to the target water level L1 is stored in the control unit 170.

Meanwhile, when the inputting of the target water level L1 is completed, the water supply valve 121 is opened, and the water is supplied into the container 2 through a water nozzle 120. And a water level detecting member 130 continuously transmits and receives an ultrasonic signal, and detects the water level in the container 2. As the water level in the container 2 is increased, the light emitting member 241 of the current water level indicating unit 240*b* located at the right side is continuously moved up or moved up in the plurality of stages while being in the ON state. Then, the light having a certain color indicated on the outer side surface of the container 2 is also moved up, and thus the user may intuitionally check a changing state of the current water level.

Meanwhile, when the current water level L2 reaches the target water level L1, all of the light emitting member 241 of the target water level indicating unit 240*a* and the light emitting member 241 of the current water level indicating unit 240*b* may be maintained in the ON state for a predetermined period of time, and then may be simultaneously turned off. At this point, information notifying that the dispensing of the water is completed may be displayed on a display 160 and/or a speaker.

In another method, at the moment or just after the current water level L2 reaches the target water level L1, one of the light emitting member 241 of the target water level indicating unit 240*a* and the light emitting member 241 of the current water level indicating unit 240*b* may be maintained in the ON state, and the other one may be turned off. A color of the light emitted from the target water level indicating unit 240*a* may be different from or the same as that of the light emitted from the current water level indicating unit 240*b*.

Meanwhile, the water dispensing apparatus according to the present disclosure may have various other embodiments other than the above-described embodiment. A water dispensing apparatus according to a third embodiment of the present disclosure is characterized in that the input part for inputting the target water level is formed in a rotary knob type. The water dispensing apparatus according to the third embodiment of the present disclosure may the same configuration as that of the water dispensing apparatus according to the first or second embodiment, except the input part. Therefore, the same components may designated by the same reference numerals, and detailed descriptions thereof may be omitted.

Figure 9:
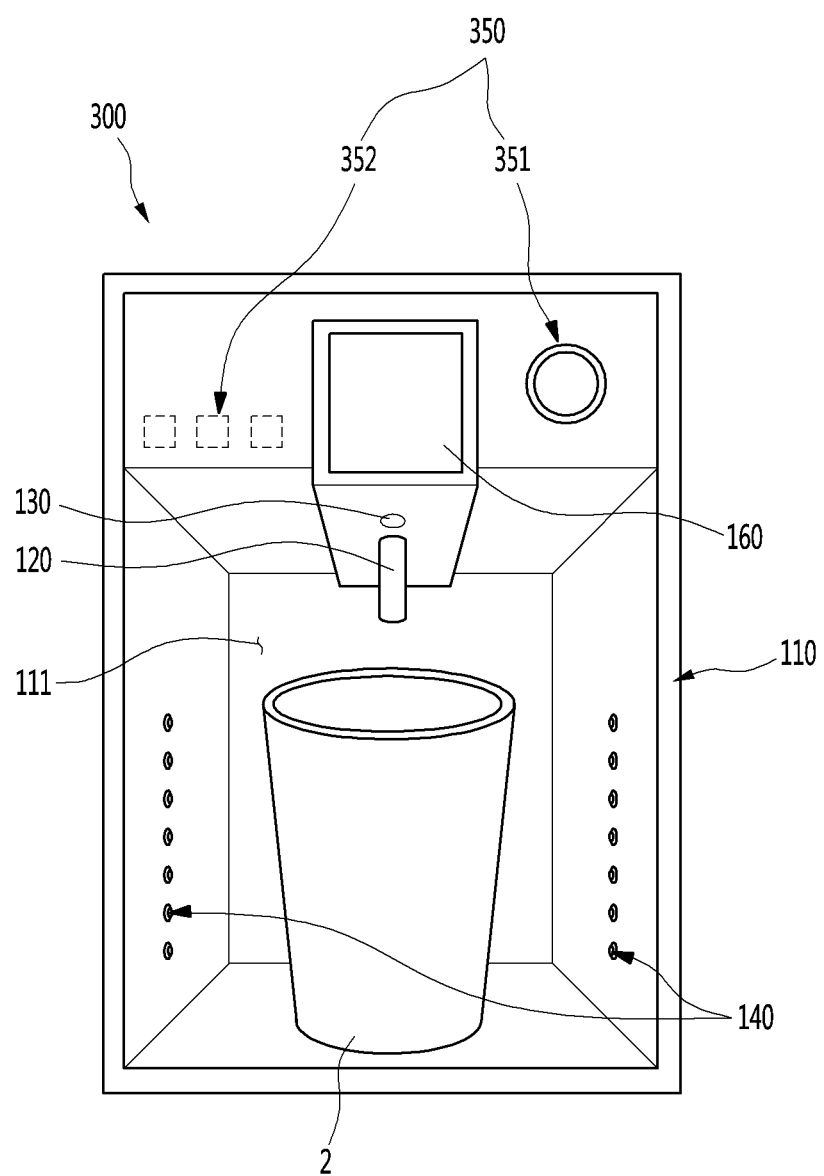
FIG. 9 is a front view of a water dispensing apparatus according to a third embodiment of the present disclosure.

Referring to FIG. 9, a water dispensing apparatus 300 according to the third embodiment of the present disclosure may include one of a structure of the fixed target water level and current water level indicating units described in the first embodiment and a structure of the movable target water level and current water level indicating units described in the second embodiment.

The water nozzle 120, the water level detecting member 130 and the display 160 are provided at the upper side of the container accommodation part 111. An input part 350 according to the embodiment may include a target water level input part 351 through which the target water level L1 of the water dispensed through the water dispensing apparatus 300 is set, and an additional condition input part 352 through which other setting conditions of the water dispensing apparatus 300 including a function of setting a type of the water to be dispensed is input. The type of the water may include purified water and cold water.

The target water level input part 351 is formed in a dial or a knob, and is formed so that an increase or decrease in the target water level L1 is determined by a user's rotary operation. For example, when the target water level input part 351 is rotated in one direction, the target water level L1 is increased, and when the target water level input part 351 is rotated in the other direction opposite to the one direction, the target water level L1 is reduced. In alternative, a knob may be a lever type where the user may push up or down the knob to set the target level.

The target water level input part 351 may be formed to be pressed, and thus, when setting of the target water level L1 is completed by the rotary operation of the target water level input part 351, the target water level L1 may be finally determined and then may be transferred to the control unit 170 by pressing the target water level input part 351. When the target water level input part 351 pressed, the target water level L1 may be set, and thus the inputting of the target water level L1 may be prevented from being undesirably performed by rotation of the target water level input part 351 due to the user's carelessness.

A rotation amount of the target water level input part 351 according to the user's operation may be transferred to the control unit 170, and the control unit 170 may transfer the set water level corresponding to the rotation amount of the target water level input part 351 to the water level indicating unit 140. The light having a certain color may be emitted from the water level indicating unit 140 corresponding to the transferred set water level, and thus the target water level L1 may be indicated on the surface of the container 2. At this point, the target water level L1 set by the rotation amount of the target water level input part 351 is determined based on the bottom surface of the container accommodation part 111.

Meanwhile, the water level indicating unit 140 may be provided at both of the left and right side surfaces of the container accommodation part 111. The water level indicating unit 140 is formed so as to enable the user to intuitively or visually recognize the target level L1 and the current level L2 of water filled in the container 2. Since the configuration and the operation of the water level indicating unit 140 may be the same as those of the water level indicating unit 140 described in the first embodiment, description thereof may be omitted. Of course, the water level indicating mechanism described in the second embodiment may also be applied to the embodiment.

Figure 10:
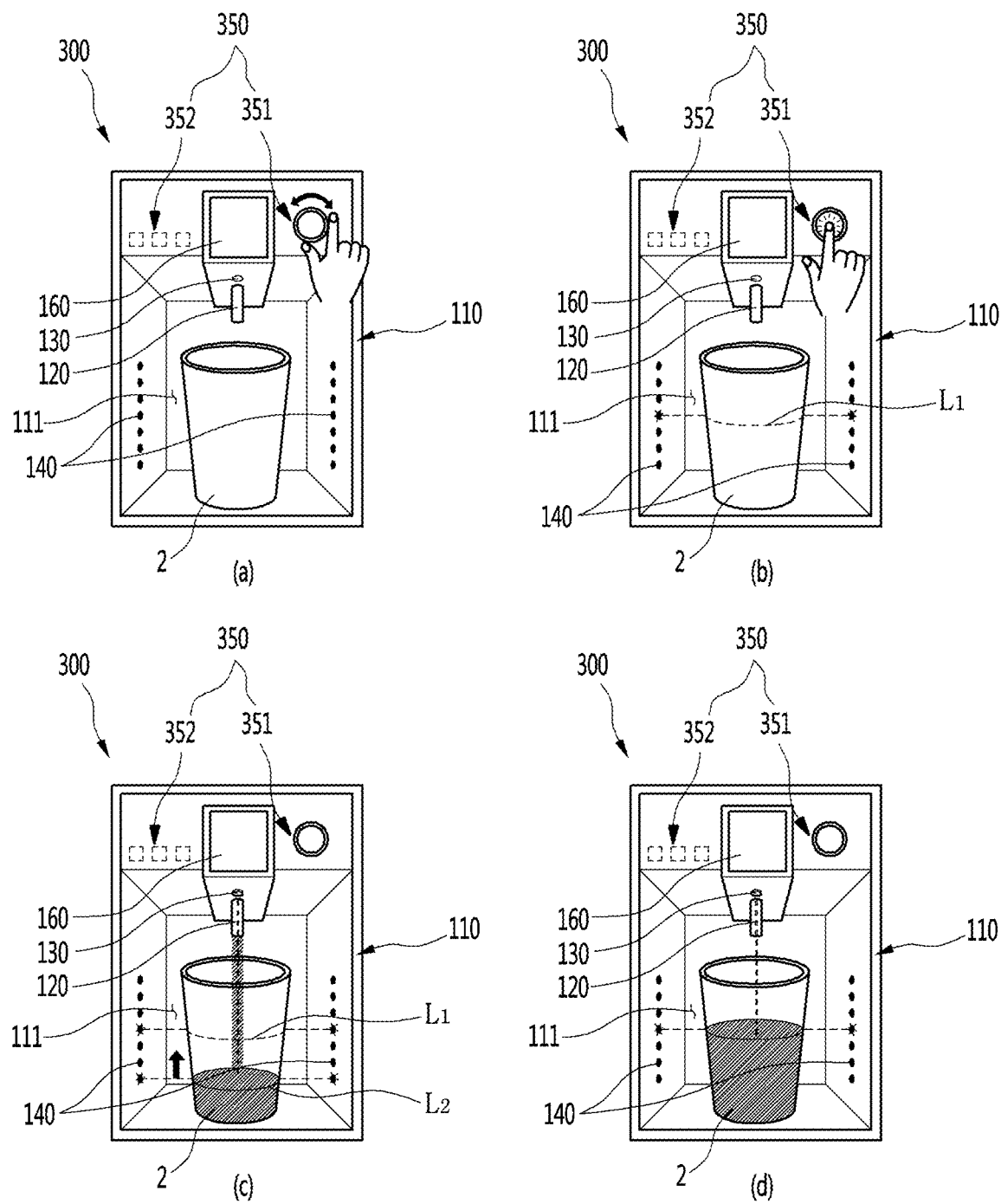
FIG. 10 is a view sequentially illustrating an operation process of the water dispensing apparatus according to the third embodiment of the present disclosure.

FIG. 10 is a view sequentially illustrating an operation process of the water dispensing apparatus according to the third embodiment of the present disclosure. To obtain the water through the water dispensing apparatus 300, first, the container 2 is located inside the container accommodation part 111, as illustrated in FIG. 10A. When the existence of the container 2 is confirmed by the water level detecting member 130, the target water level input part 351 is in a state which can be operated by the user. The user may rotate the target water level input part 351, and may determine the target level L1 of water to be supplied into the container 2. A height of the target water level L1 is set based on the bottom surface of the container accommodation part 111.

For example, when the user rotates the target water level input part 351 in a clockwise direction, the control unit 170 turns on the light emitting member 141 located at a height corresponding to the rotation amount of the target water level input part 351, and indicates the target water level L1 on the outer side surface of the container 2. When the target water level input part 351 is further rotated in the clockwise direction, the light emitting member 141 located at an upper side is turned on.

When the target water level L1 is intended to be reduced, the target water level input part 351 is rotated in a counter-clockwise direction, and thus the control unit 170 turns on the light emitting member 141 located at a height which is reduced by a reverse rotation amount.

When the inputting of the target water level L1 through the target water level input part 351 is completed, the user inputs a setting completion signal of the target water level L1 by pressing the target water level input part 351, as illustrated in FIG. 10B. Then, the water level set by the user is determined as the target water level L1. The light emitting member 141 located at a height corresponding to the determined water level is continuously maintained in the ON state, and the light is continuously radiated on the surface of the container 2.

When the inputting of the target water level L1 is completed, the water supply valve 121 is opened, and the water is supplied into the container 2 through the water nozzle 120, and thus the water level is increased. At this point, the water level detecting member 130 continuously transmits and receives the ultrasonic signal, and detects the change of the water level in the container 2. When the water level in the container 2 reaches a height of each of the preset light emitting members 141, the light emitting member 141 corresponding to the reached water level is turned on to indicate the current water level L2.

When it is determined that the water filled in the container 2 reaches the target water level L1, the water supply valve 121 is closed, and the light emitting member 141 is turned off, and information notifying that the dispensing of the water is completed may be output through the display 160 or a sound. This process is the same as that described in the previous embodiments. Alternatively, a color emitted by the light emitting member may change such the recess 111 is illustrated in a preset color.

A method for setting the target water level according to a fourth embodiment of the present disclosure is characterized in that the input part is configured with a dragging type touch pad. A water dispensing apparatus according to the fourth embodiment of the present disclosure may have the same configuration as that of the water dispensing apparatus according to the first to third embodiments, except the input part through which the target water level is input. The same components may be designated by the same reference numerals, and detailed descriptions thereof may be omitted.

Figure 11:
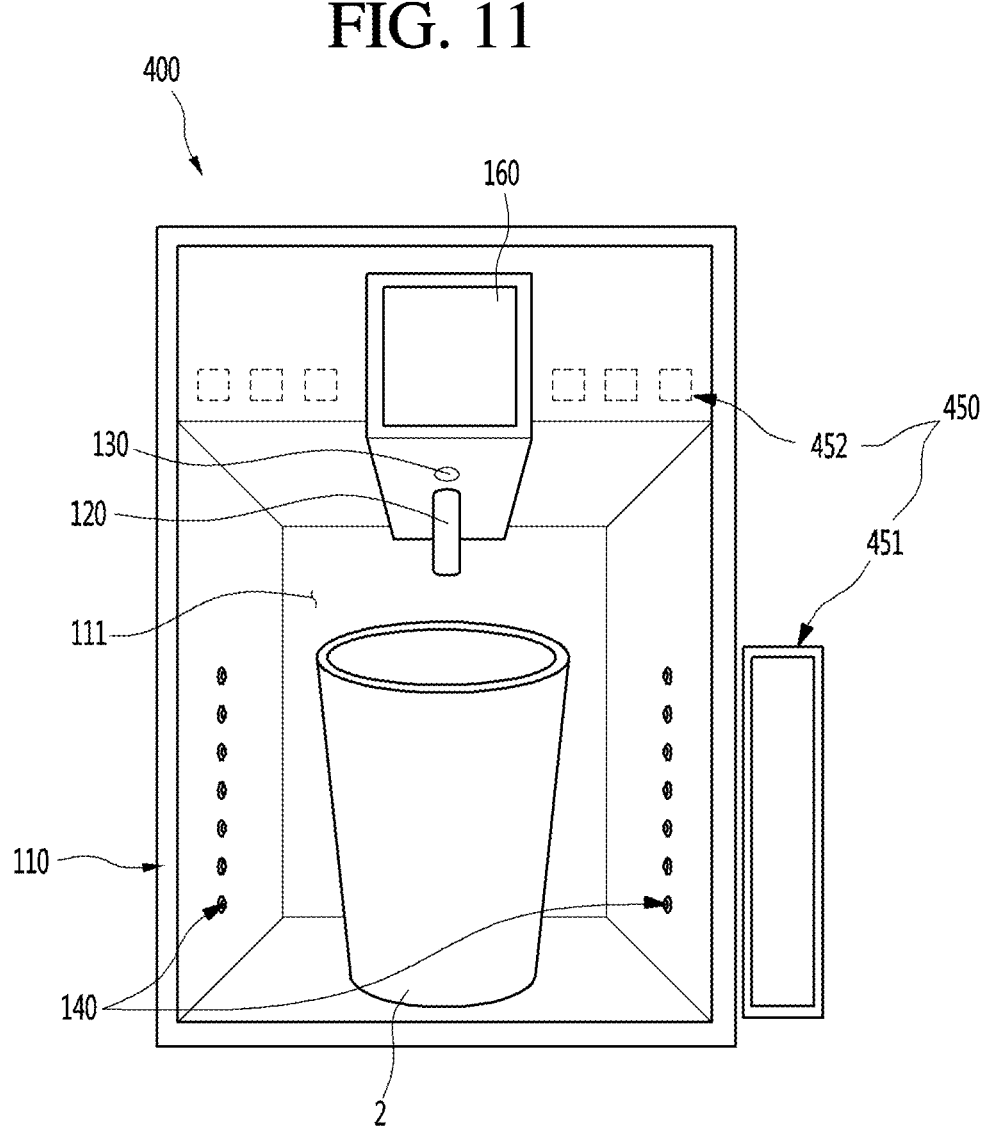
FIG. 11 is a front view of a water dispensing apparatus according to a fourth embodiment of the present disclosure.

FIG. 11 is a front view of a water dispensing apparatus according to a fourth embodiment of the present disclosure. A water dispensing apparatus 400 according to the fourth embodiment of the present disclosure may include one of the water level indicating unit 140 described in the first embodiment and the water level indicating unit 240 described in the second embodiment. For convenience of explanation, an example in which the water level indicating unit 140 described in the first embodiment is applied will be described.

The functions and configurations of the dispenser housing 110 in which the container accommodation part 111 is formed to be recessed, the water nozzle 120, the water supply valve 121, the water level detecting member 130, and the display 160 formed at the dispenser housing 110 corresponding to the upper portion of the container accommodation part 111 may the same as those described in the previous embodiments, and description thereof may be omitted.

An input part 450 which is a characteristic of the embodiment may include a target water level input part 451 through which the target level L1 of water dispensed through the water dispensing apparatus 400 is set, and an additional condition input part 452 through which other setting conditions of the water dispensing apparatus 400 including a function of setting a type of the water to be dispensed is input. The additional condition input part 452 may be disposed at an upper area of the dispenser housing 110 corresponding to the upper side of the container accommodation part 111.

The target water level input part 451 may be formed in a touch pad type, and may have a touch and drag function. The target water level input part 451 may be disposed at an outer side of the dispenser housing 110, and may be formed in a rectangular shape, which extends vertically. The target water level input part 451 may extend from the bottom surface of the container accommodation part 111 to a lower end of the water nozzle 120. Therefore, a height of the water supplied into the container 2, i.e., the target water level L1 may be set by a user's dragging operation.

Alternatively, the plurality of light emitting members 141 may be disposed at an area from the bottom surface of the container accommodation part 111 to the target water level input part 451, or the light emitting members 241 may be formed to be moved upward to an upper end of the target water level input part 451.

The target water level input part 451 may be formed to be operated by an touching operation, and when setting of the target water level L1 is completed through the dragging operation of the target water level input part 451, the target water level L1 may be finally determined by touching the target water level input part 451. It may be configured that the dragging operation of the target water level input part 451 may be performed only after the touching operation of the target water level input part 451, and thus an undesirable inputting may be prevented from being performed by an erroneous operation due to the user's carelessness.

Figure 12:
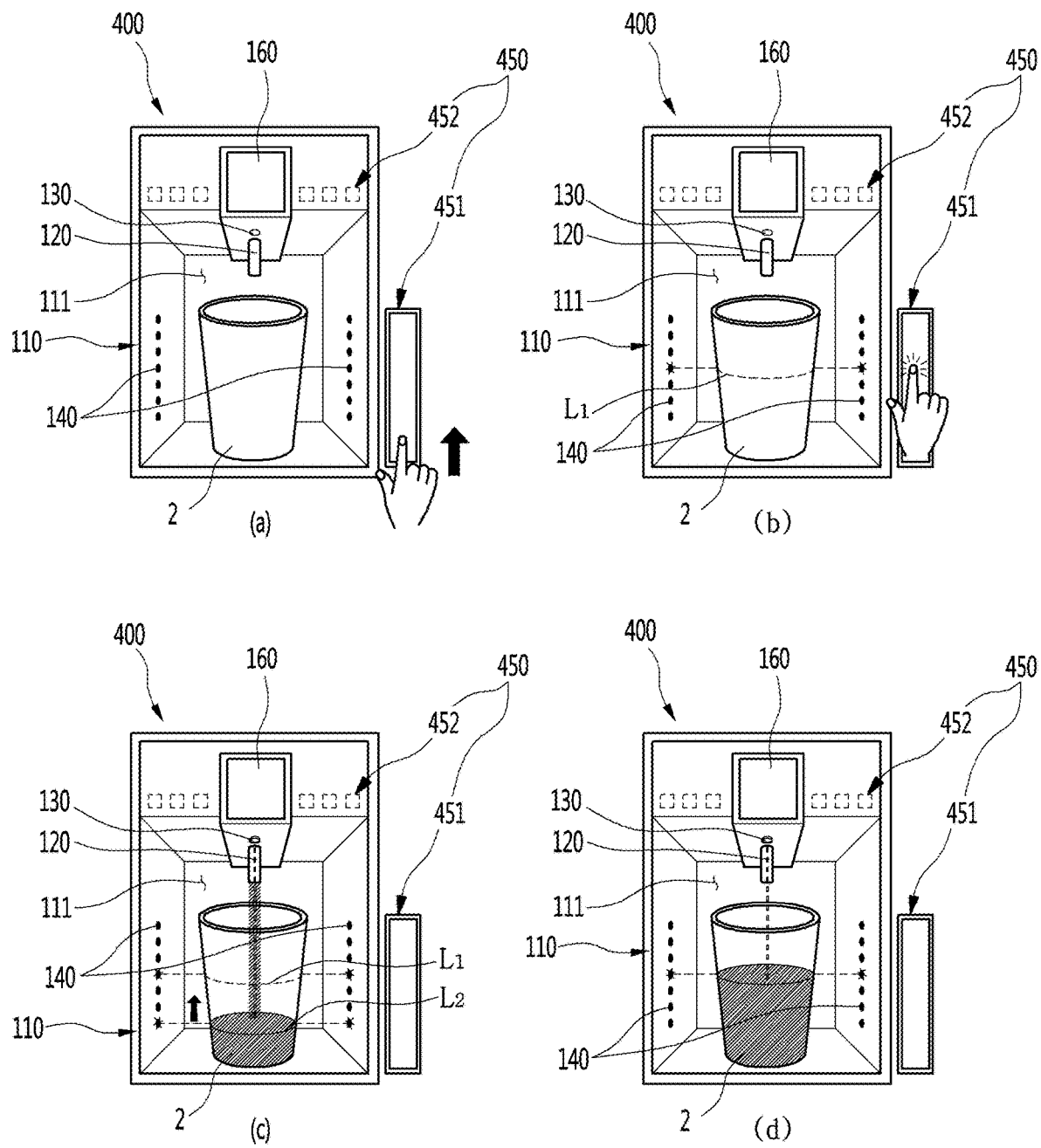
FIG. 12 is a view sequentially illustrating an operation process of the water dispensing apparatus according to the fourth embodiment of the present disclosure.

FIG. 12 is a view sequentially illustrating an operation process of the water dispensing apparatus according to the fourth embodiment of the present disclosure. The container 2 is located at the container accommodation part 111, as illustrated in FIG. 12A, and when it is confirmed that the container 2 is disposed in the space of the dispenser housing 110, the user operates the target water level input part 451 by the touching and dragging operation, and sets the target level of water supplied into the container 2.

When the setting of the target water level L1 is completed through the input part 450, the target water level L1 is determined by touching the target water level input part 451, as illustrated in FIG. 12B. The control unit 170 controls the light emitting member 141 located at a position corresponding to the target water level L1 to continuously emit the light toward the container 2.

As illustrated in FIGS. 12C and 12D, as the water level is increased by the supplying of the water, the light emitting member 141 indicating the current water level L2 is changed, or moved upward. When the current water level L2 reaches the target water level L1, the light emitting member 141 is turned off, and the information notifying that the supplying of the water is completed is output. This process is the same as that described in the previous embodiments.

A fifth embodiment of the present disclosure is characterized in that the input part is configured with a dragging type touch pad, and a display which displays the current water level is further provided. A water dispensing apparatus according to the fifth embodiment of the present disclosure may have the same configuration as that of the water dispensing apparatus according to the first embodiment, except the input part and the display. The same components may be designated by the same reference numerals, and detailed descriptions thereof may be omitted.

Figure 13:
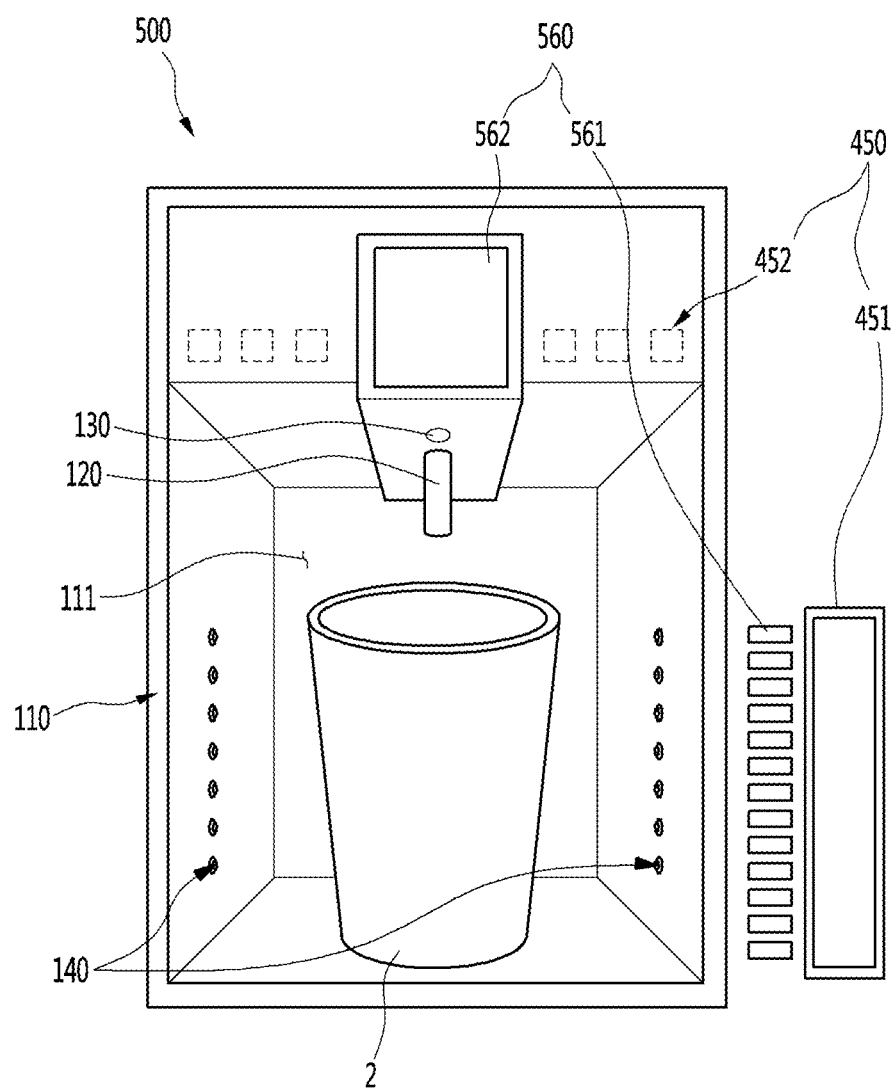
FIG. 13 is a front view of a water dispensing apparatus according to a fifth embodiment of the present disclosure.

FIG. 13 is a front view of a water dispensing apparatus according to a fifth embodiment of the present disclosure. A water dispensing apparatus 500 may have the same configuration as that of the water dispensing apparatus 400 according to the fourth embodiment, except that a display is further provided, as illustrated in the drawing. A display 560 according to the embodiment may include a water level indicating display 561, which indicates a level of water filled in the container 2, and an operation state indicating display 562, which indicates an entire operation state of the water dispensing apparatus 500. If needed, the display 560 may be formed in a single body which indicates all of the operation state of the water dispensing apparatus 500 and the level of dispensed water.

The water level indicating display 561 is formed to visualize and indicate the level of water filled in the container 2 and thus to allow the user to intuitively and/or visually recognize the water level. Specifically, the water level indicating display 561 may be disposed at a side of the dispenser housing 110 to be close to the target water level input part 451. The water level indicating display 561 may include a plurality of light emitting module assemblies which are disposed to be vertically spaced apart from each other.

The water level indicating display 561 may indicate the target water level L1 set by the user, and may indicate all of the current water level L2 and the target water level L1. To indicate all of the current water level L2 and the target water level L1, the current water level L2 and the target water level L1 may be indicated on the water level indicating display 561 so that a light color of the light emitting module indicating the current water level L2 is different from that of the light emitting module indicating the target water level L1. The light color of the light emitting module indicating the current water level L2 may be also different from that of the light emitting module indicating the target water level L1, and a state in which the current water level L2 is increased may be indicated.

One of the water level indicating unit 140 described in the first embodiment and the water level indicating unit 240 described in the second embodiment may be installed at both side surfaces of the container accommodation part 111.

Figure 14:
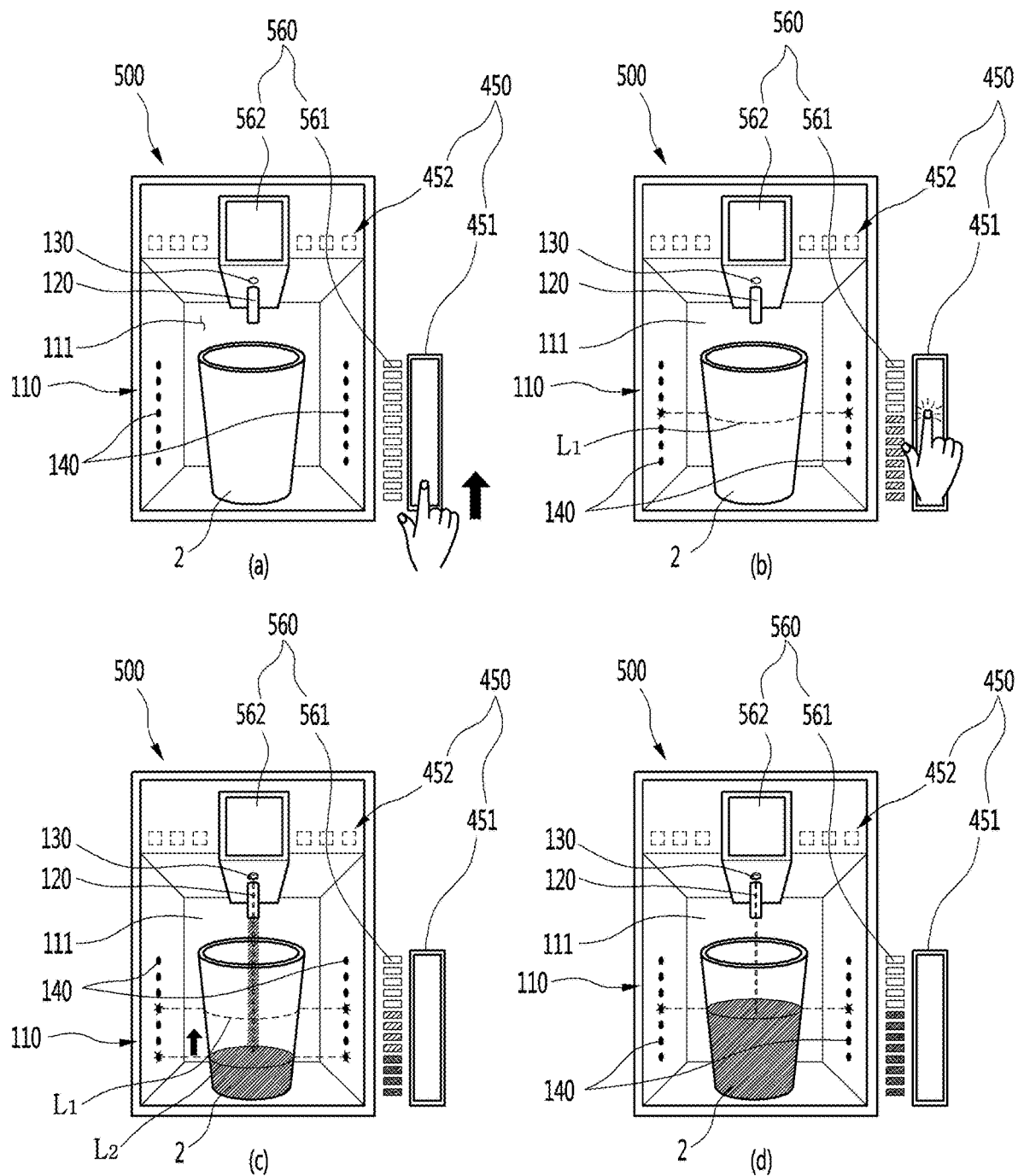
FIG. 14 is a view sequentially illustrating an operation process of the water dispensing apparatus according to the fifth embodiment of the present disclosure.

FIG. 14 is a view sequentially illustrating an operation process of the water dispensing apparatus according to the fifth embodiment of the present disclosure. Since a process in which the target water level L1 is set may be the same as that described in the fourth embodiment, as illustrated in FIGS. 14A and 14B, description thereof will be omitted. A process in which the supplying of the water is started, and the target water level L1 and the current water level L2 are indicated on the surface of the container 2, and the water level indicating unit 140 is operated according to an increase in the current water level L2 may be the same as that described in the fourth embodiment.

Different from the fourth embodiment, as illustrated in FIGS. 14C and 14D, the control unit 170 may enable all of the current water level L2 and the target water level L1 to be indicated with different colors from each other on the water level indicating display 561, or may indicate only the current water level L2 on the water level indicating display 561. The control unit may also indicate only the current water level L2 on the water level indicating display 561, when the current water level L2 reaches the target water level L1. As the current water level L2 is increased, the number of light emitting modules, which are turned on, may be increased, and thus an optical graph or an optical bar may extend from a lower side toward an upper side.

The water dispensing apparatus and the control method thereof according to the embodiment of the present disclosure having the above-described configuration have the various effects and advantages.

Since the target water level and the current water level are indicated on the container through the water level indicating unit, the user can intuitively and/or visually check and exactly receive the desired amount of water in the container. Instead of a cc scale or a percentage unit of the container, which is difficult to be recognized by the user, the level of water to be filled and the state in which the water is filled are directly indicated on the container, and thus user convenience can be enhanced, and an accurate amount of water can be dispensed.

Since the water level indicating unit is also operated through a tactile operation of the input part, and thus the water level is set through the simple and tactile operation such as touching, rotating and dragging, the user convenience can be further enhanced. Since the current level of water, which is being supplied, and the target water level are indicated at the same time, a water supply state can be effectively transferred to the user.

The water dispensing apparatus can supply the water by a water level set based on the bottom of the housing space on which the container is seated, regardless of a height of the container. Regardless of a size and a shape of the container and existence of an object (a spoon, a straw or the like) put in the container, the water can be supplied by an absolute standard, and thus operation reliability of the sensor and the driving unit for dispensing the water can be enhanced. Since all of the changing level of the water currently supplied and the target water level are indicated, the user can exactly recognize the water supply state, and thus can easily estimate a time for terminating the water supply.

The present disclosure is directed to a water dispensing apparatus which enables a user to intuitively grasp a water supply state, thereby enhancing user convenience, and a control method thereof. Also, the present disclosure is also directed to a water dispensing apparatus, which enhances a user convenience by an intuitive operation, and a control method thereof.

A water dispensing apparatus may include a dispenser housing at which a container accommodation part accommodating a container is formed to be recessed; a water nozzle provided at a first inner surface of the dispenser housing, the first inner surface of the dispenser housing configured to define an upper surface of the container accommodation part; a water level detecting member provided at the first inner surface of the dispenser housing close to the water nozzle and configured to detect a level of water filled in the container; a target water level input part provided to input the level of water filled in the container; and a water level indicating unit provided at a second inner surface of the dispenser housing to indicate a water level on the container, the second inner surface configured to define a side surface of the container accommodation part.

A method for controlling a water dispensing apparatus may include detecting a container put in a container accommodation part by a water level detecting member provided at a dispenser housing; inputting a target water level by an operation of an input part which inputs the target water level; and radiating light from a water level indicating unit to an outer surface of the container, and thus indicating the target water level on the outer surface of the container.

Even though all the elements of the embodiments are coupled into one or operated in the combined state, the present disclosure is not limited to such an embodiment. That is, all the elements may be selectively combined with each other without departing from the scope of the disclosure. Furthermore, when it is described that one comprises (or includes or has) some elements, it should be understood that it may comprise (or include or have) only those elements, or it may comprise (or include or have) other elements as well as those elements if there is no specific limitation. Unless otherwise specifically defined herein, all terms comprising technical or scientific terms are to be given meanings understood by those skilled in the art. Like terms defined in dictionaries, generally used terms needs to be construed as meaning used in technical contexts and are not construed as ideal or excessively formal meanings unless otherwise clearly defined herein.

Although embodiments have been described with reference to a number of illustrative embodiments thereof, it will be understood by those skilled in the art that various changes in form and details may be made therein without departing from the scope of the disclosure as defined by the appended claims. Therefore, the preferred embodiments should be considered in a descriptive sense only and not for purposes of limitation, and also the technical scope of the disclosure is not limited to the embodiments. Furthermore, the present disclosure is defined not by the detailed description of the disclosure but by the appended claims, and all differences within the scope will be construed as being comprised in the present disclosure.

What is claimed is:

1. A method for controlling a water dispensing apparatus, comprising:
    detecting a container placed in a container recess by a water level detector provided at a dispenser housing;
    receiving a target water level by an operation of an input interface;
    radiating light from a target water level indicator to an outer surface of the container, and thus indicating the target water level on the outer surface of the container, the target water level indicator including a first light emitting element and a first driver moving the first light emitting element up or down;
    opening a water supply valve when the target water level is received;
    dispensing water through a water nozzle exposed to an upper surface of the recess, and filling the container with the water;
    detecting a current level of the water filled in the container by the water level detector; and
    radiating the light from a current water level indicator to the outer surface of the container to indicate the current water level on the outer surface of the container, the current water level indicator including a second light emitting element and a second driver moving the second light emitting element up or down,
    wherein, when the target water level is set, the first driver moves the first light emitting element up to a height corresponding to the target water level and stops at the height, and
    wherein, as the current level of the water increases, the second driver continuously moves the second light emitting element up to the height corresponding to the current water level.

2. The method according to claim 1, wherein, when there is non-detection of the container by the water level detector, receiving of the target water level is prevented.

3. The method according to claim 1, wherein the target water level indicator is disposed at a first side surface of the container recess, and the current water level indicator is disposed at a second side surface of the container recess.

4. The method according to claim 1, wherein the water level detector comprises an ultrasonic sensor, and
    when a distance from the water level detector to a bottom of the recess, which is detected by the ultrasonic sensor, is shorter than an initially set distance, receiving of the target water level is activated.

5. The method according to claim 1, wherein receiving of the target water level comprises operating one or more of a plurality of input buttons provided at the dispenser housing, and a water level value based on input to the button is set as the target water level.

6. The method according to claim 1, wherein the receiving of the target water level comprises pressing several times one of a plurality of input buttons provided at the dispenser housing, and a water level value is based on number of times the button is depressed.

7. The method according to claim 1, wherein the receiving of the target water level comprises:
    rotating a dial knob provided at the dispenser housing at a predetermined angle; and
    pressing the dial knob, wherein when the dial knob is pressed, a water level value corresponding to a rotation amount of the dial knob before the dial knob is pressed is determined as the target water level.

8. The method according to claim 1, wherein the receiving of the target water level comprises:
    dragging a screen of a touch pad provided at an outside of the dispenser housing; and
    touching the screen of the touch pad after the dragging, wherein when the screen of the touch pad is touched, a dragged height before the screen of the touch pad is touched is determined as the target water level.

9. The method according to claim 1, further comprising selecting one of purified water and cold water,
    wherein the selection of one of the purified water and the cold water is performed before or after the target water level is input.

10. The method according to claim 1, wherein a color of the light indicating the target water level is set to be different from that of the light indicating the current water level.

\* \* \* \* \*